INVENTOR.
STANLEY BREEN
BY
*Dike, Thompson, Sanborn & Bronstein*
ATTORNEYS

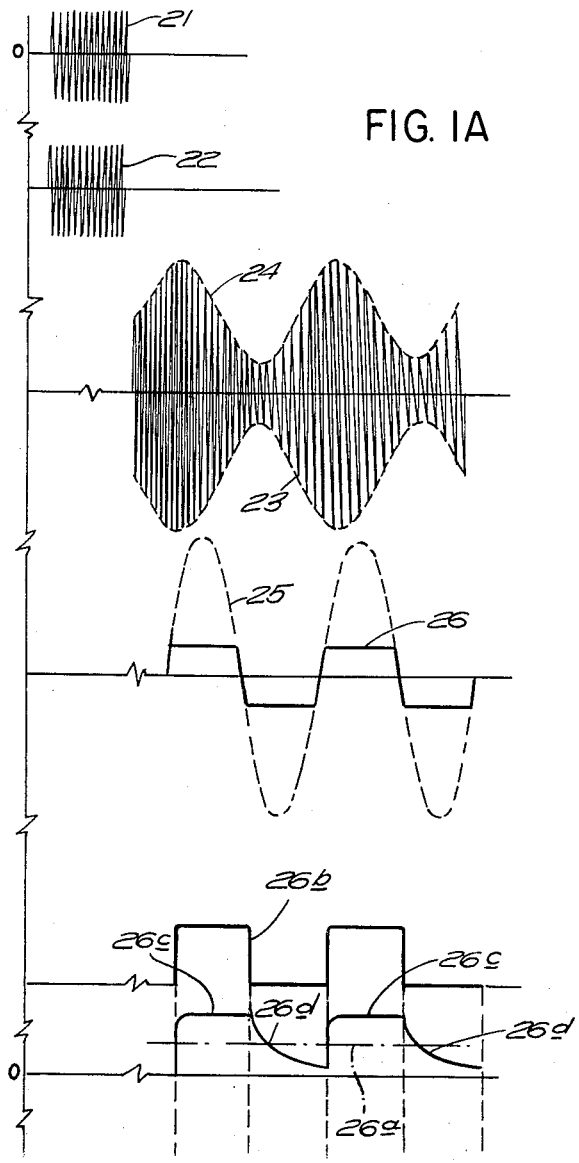

Dec. 5, 1961  S. BREEN  3,012,193
APPARATUS AND METHOD FOR MEASURING
CAPACITIVITY OF A MATERIAL
Filed Oct. 21, 1957  6 Sheets-Sheet 6

TYPICAL CALIBRATION CHART = WOOL TOP

INVENTOR.
STANLEY BREEN
BY
Dike, Thompson, Sanborn & Bronstein
ATTORNEYS

3,012,193
Patented Dec. 5, 1961

3,012,193
APPARATUS AND METHOD FOR MEASURING CAPACITIVITY OF A MATERIAL
Stanley Breen, Norwood, Mass., assignor to Forte-Fairbairn, Inc., Norwood, Mass., a corporation of Delaware
Filed Oct. 21, 1957, Ser. No. 691,269
10 Claims. (Cl. 324—61)

The present invention relates in general to electronic apparatus and method for sensing the properties of a substance by measuring its capacitivity, i.e., its effect on the capacity of a capacitor and more particularly concerns a novel apparatus and method which provides an accurate indication of the percentage of moisture in a material under test. The term property as used herein includes dimensions.

Such apparatus and method have wide application in both commerce and industry. In commerce, the accurate knowledge of moisture content has a direct bearing to the price and value of a commodity. In industry the workability, storage properties, and composition of materials is greatly affected by the moisture content. Examples of the above are well known in the textile industry where the spinning and weaving properties of a fibre are dependent upon proper moisture content of the stock. In the construction industry an accurate knowledge of the moisture content of sand and gravel assists in determining the total water to include in the concrete mix. The storage and transport problems of foodstuffs is a function of moisture content in many instances. Other examples can be found in the plastic, paper, tobacco, drug, and other industries.

Such apparatus and method can also be used to measure accurately the dimensions of precision parts or the thickness of sheet material.

Since capacitivity of a material is a function of its dielectric constant and since the dielectric constant is a function of the properties, such as moisture content of the material, the measurement of such properties is obtained by measuring the dielectric constant. Furthermore, since the capacitivity of the material is a function of its dimensions, such dimensions can be determined by measuring its capacitivity.

An object of the present invention is to provide an electronic apparatus employing a pair of oscillators operating at a low difference frequency for electronically measuring the properties, particularly the moisture content, of a material, which apparatus is sufficiently stable and sensitive so that accurate precision measurements can be obtained by direct reading of an indicating meter without the necessity of adjusting or calibrating the apparatus for each measurement. Consequently, the apparatus can be operated rapidly by operators of varying skills with a minimum of effort and human error and thereby permits accurate, sensitive and immediate control of a manufacturing process by the operator.

Another object of the present invention is to provide such an apparatus which is extremely sensitive and hence with which very small changes in the properties of the material can be accurately measured. These changes are converted into changes in frequency of one of the oscillators which are in turn converted into changes in the frequency difference between the two oscillators. The present invention permits the use of a small frequency difference between the two oscillators. Consequently, a very small actual change in such frequency difference caused by a small change in properties constitutes a relatively large measurable percentage difference based on the frequency difference. Another object of the invention is to achieve the preceding object with compact apparatus formed of relatively inexpensive components. Another object is the provision of means for calibrating the meter to directly indicate the percentage of moisture content with different substances by making but a single adjustment.

Another object of the present invention is to provide an improved test cell for use in such an apparatus and in which the effective capacity is not detrimentally affected by non-uniformity in the sample because the lines of flux are maintained substantially uniform throughout the active area of the cell. Another object is to provide an improved test cell which is not detrimentally affected by external disturbances, the whole cell being enclosed in a grounded shield. A further object is to provide a capacitive test cell which minimizes errors due to variations in position of the substance within the cell.

Another object is to provide a test cell and an electronic apparatus incorporating the same which is capable of receiving and accurately and electronically measuring the properties of a sample of any size and shape. For example the moisture content of balls of wool top can be accurately measured electronically without removing the ball from its bag or removing samples from the ball or making complicated adjustments. It is only necessary to insert the ball in the test cell, whereafter a direct reading is taken and the moisture content arrived at from this reading. A ball of wool top is an unwoven rope of combed wool wound up in a ball about 15 inches in diameter by 14 inches high and weighs between fifteen to twenty pounds. The shape is essentially cylindrical with conical ends at one or both ends. It is frequently packed in an individual bag of paper or polyethylene. No electronic apparatus has heretofore been successfully used to measure the integrated moisture content of balls of wool top.

Another object is to provide a method employing a pair of oscillators and low beat frequencies for measuring accurately and electronically on a direct reading instrument the properties of a material without the necessity of an adjustment or calibration for each measurement.

These objects are attained in accordance with the present invention by making the two oscillators substantially identical twins electrically and mechanically and by providing a regulated power supply, preferably from a common source, to the plates and filaments of both oscillators. Consequently, the plate voltages of both oscillators are always substantially the same and the filament voltages of both oscillators are always substantially the same. By using substantially identical twin oscillators and common regulated power sources, unavoidable changes affecting the frequency of one oscillator will also affect the frequency of the other in the same way and, consequently, the frequency difference will remain substantially the same. The oscillators are "substantially identical twins" as these terms are used herein when they are so alike electrically and mechanically that the frequency difference between them when they are both adjusted substantially to the same frequency does not vary more than ±150 c.p.s., preferably 90 c.p.s. and more preferably ±45 c.p.s. per million c.p.s. of oscillator frequency over any fifteen minute, preferably one hour, period, due to environmental changes in ambient temperature, humidity, pressure, etc., which are normally encountered in the locality where the apparatus is intended to be used. In most cases these conditions vary in temperature between 60° F. and 100° F. and relative humidity between 20% and 95%. However, it is most suitable to make the oscillators as similar as possible and by so doing, it is possible to avoid variations in the frequency difference greater than ±20 c.p.s. per million c.p.s. of oscillator frequency which enables moisture determinations to a precision of 0.1%. Frequency drift has been limited to ±45 c.p.s. per million c.p.s. of oscillator frequency over periods of more than two hours although even a period of fifteen minutes permits a large number of measurements to be taken without adjustment. It has been limited to 100 c.p.s. over a period of days. As a practical matter, the capacitor test cell of the one oscillator and the corresponding reference capacitor of the other may differ in physical design, shape and location without detrimentally impairing system stability, provided the balance of their associated oscillator circuitries are alike.

The best results are obtained by using similar vacuum tubes and similar associated components such as resistors, capacitors, inductors, tube sockets and other hardware and mounting them on a single aluminum plate, each oscillator being enclosed in its own shielded container of similar material and construction.

Preferably, the D.C. plate voltage is regulated to within ±4%, and more preferably ±1%, of its set value and the A.C. filament voltage is regulated to within ±5%, more preferably ±3% of its set value.

It is preferred that the frequency difference between the two oscillators be less than about 100,000 c.p.s., preferably less than 50,000 c.p.s. and more preferably within the audio spectrum. Preferably, the tank coils of the two oscillators are located physically in a direction transverse to each other so that to this extent also the oscillators are not identical in construction. The best results are obtained when they are located about 90 degrees from each other. This reduces coupling of the two oscillators at small difference frequencies, thereby permitting the use of very small difference frequencies, for example 25 c.p.s. with megacycle oscillators, which enhances sensitivity. Without this feature, when the difference between the two frequencies is very small, they are apt to lock in and there will be no beat signal.

It is also preferable to utilize oscillators which have a grounded grid. It has been found that this substantially increases the stability of the system.

The two signals are fed into an adder circuit; preferably linear, of the type described at pages 431 and 433 of Vacuum-Tube Circuits and Transistors by Lawrence Baker Arguimbau, published in 1956 by John Wiley & Sons, which produces an added signal output having an effective amplitude which waxes and wanes at a frequency equal to the difference between the two oscillator frequencies. This adder circuit has the advantage of not producing any spurious, unwanted frequency components.

The added signal is detected (rectified and filtered) and then limited. The frequency of the detected and limited signal is substantially the same as the frequency at which the effective amplitude of the output of the adder circuit waxes and wanes.

The detected, limited signal is passed to a non-resonant discriminator which converts it into a direct current, the magnitude of which depends upon the frequency of the detected, limited signal and which is directly readable by an ammeter. Preferably, the negative peaks of the detected, limited signal are clamped to ground before the signal is converted into a direct current.

Since the frequency at which the effective amplitude of the summed output signal of the adder circuit waxes and wanes depends upon the frequency of the output of the oscillator in which the test cell is connected, which in turn is dependent on the moisture content of the sample as evidenced by its dielectric constant, and since the frequency of the detected signal depends on the frequency at which such effective amplitude waxes and wanes and the magnitude of the direct current signal depends on the frequency of the detected signal, it is apparent that the meter reading, which depends on the magnitude of the direct current produced, is dependent upon and indicates the moisture content of the sample.

The added, detected signal is limited to prevent any amplitude variations in the signal passing to the discriminator from affecting the output current.

Means are provided for providing a biasing current to the ammeter and for adjusting the amount of such biasing current so that the unit can be used to directly indicate on the meter the moisture content of different materials by adjusting the amount of bias to the meter.

Preferably, the power supply to the plates of the adder circuit, the detector and the limiter are derived from a regulated power supply. One way of doing this is to utilize the same common power supply as the plates of the oscillators. The power supply to the filaments of the adder circuit, detector, limiter and discriminator (including the clamping means) are also derived from a regulated power supply, which may be the same as the common power supply to the filaments of the two oscillators. This enhances the stability of the system, especially in the case of the limiter.

It is the stability of the system of the present invention which makes it possible to obtain accurate, high precision direct readings without frequent adjustments. Without it, a direct reading instrument is not practical and suitably accurate measurements cannot be obtained.

Furthermore, this stability makes it possible to obtain a high degree of sensitivity by the use of small beat frequencies. This sensitivity in turn contributes to the achievement of direct readings.

The pair of oscillators may be considered as reference and variable oscillators oscillating at different frequencies and with the capacitive test cell coupled to the variable oscillator and accommodating the substance under test.

The adding circuit comprises an amplifier tube with its plate circuit tuned to a frequency near the frequency of the oscillator signals and energized at its grid with the cumulative combination of the latter signals.

The discriminator circuit is a non-resonant one and comprises a diode serially-connected to a parallel combination of resistance and capacitance, the time constant of the latter combination being equal to the period of a signal having a frequency less than 100,000 c.p.s., preferably less than 50,000 c.p.s., more preferably within the audio spectrum. The ammeter is coupled to the parallel combination, its scale preferably reading directly in percentage moisture content.

An important advantage of the circuit of the present invention is that no tuned circuits are involved in the detector, limiter or discriminator and all the adjustment and stability problems commonly associated therewith are circumvented. The use of a discriminator having a storage capacitor system is particularly advantageous in the present invention.

An important advantage of utilizing frequency difference is that amplitude variations of the oscillators, adder and detector are advantageously not critical.

The test cell construction of the present invention cooperates with the other elements of the system to provide extremely accurate measurements. This is achieved by making the projection of the cross sectional dimension of the sample on the two plate means of the capacitance test cell smaller than the cross sectional areas of each. This maintains the lines of electric flux through the sample substantially uniform. The cell is completely enclosed in a grounded shield or sheath which reduces the effect of external disturbances. These features eliminate errors due to non-uniformity in the sample and external disturbances. They also make possible the electronic measurement of moisture content of a ball of wool top, as such, and other relatively large and irregular shaped samples without taking the ball or sample apart.

Other features, objects and advantages will become apparent from the following detailed description when read in connection with the accompanying drawings in which:

FIG. 1 is a block diagram of the system together with a graphical representation of signals which may be observed at the designated points;

FIG. 1a provides illustrations of signals and waveforms appearing in the circuitry shown in FIG. 1 in more detail and enlarged;

Figure 1:
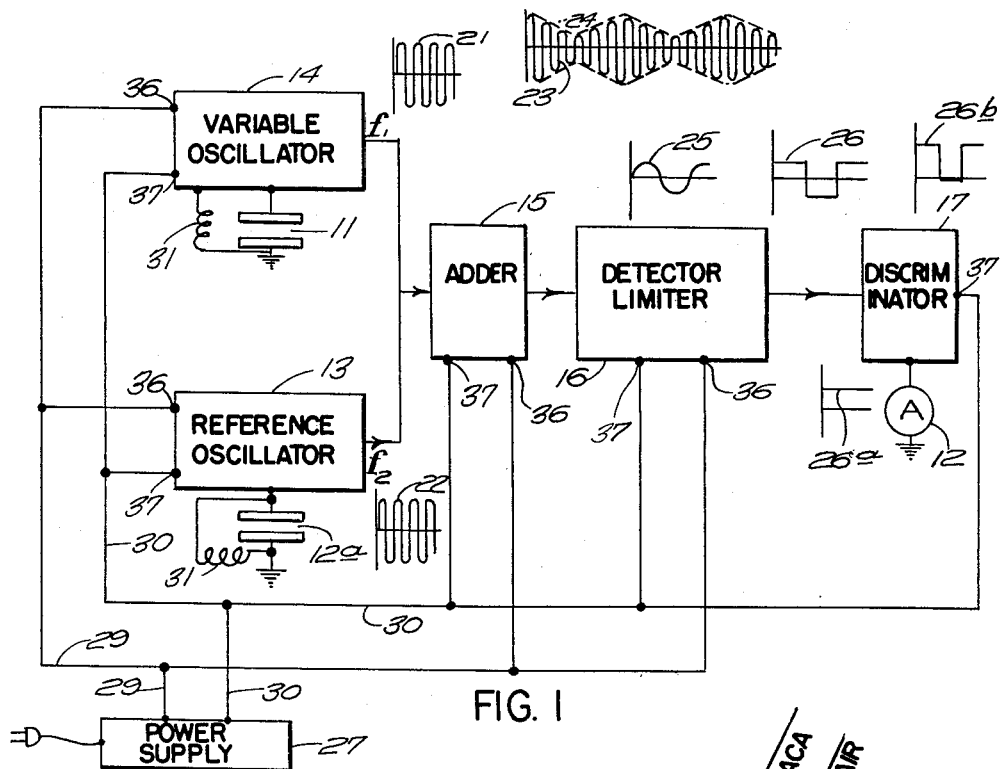

With reference to the drawings, and more particularly FIG. 1 thereof, a block diagram of the system is illustrated together with a graphical representation of signal waveforms at the designated points. These waveforms are illustrated in greater detail and are enlarged in FIG. 1a. The percentage moisture content of a substance inserted between the plates of capacitive test cell 11 is directly indicated on ammeter 12. Before describing the mode of operation of the system which results in this indication, its physical arrangement will be described. A variable reference capacitor 12a is connected across the frequency-controlling circuit of reference oscillator 13. Capacitive test cell 11 is connected across the corresponding circuit of variable oscillator 14. Oscillators 13 and 14 are coupled to adder circuit 15 which energizes detector-limiter 16. Detector-limited 16 is coupled to discriminator 17 which provides a signal to ammeter 12 having a direct current component which is indicated by the ammeter.

The signal waveforms represented in FIGS. 1 and 1a will be helpful in understanding the operation of the system. Waveforms 21 and 22 of frequencies $f_1$ or $p$ and $f_2$ or $q$ respectively are the respective output signals from variable oscillator 14 and reference oscillator 13. The frequency $f_1$ is related to the dielectric constant of the substance between the plates of test cell 11. The frequency $f_2$ may be adjusted by adjusting reference capacitor 12a, which is made adjustable, so that with a sample having a known moisture content positioned in test cell 11, ammeter 12 indicates the known moisture percentage content. Thereafter further adjustment of capacitor 12a is required only to compensate for long term drift. The two oscillator signals are linearly added in adder circuit 15 to provide the output signal 23, the effective amplitude 24 of which waxes and wanes at a rate or frequency substantially equal to the difference between frequencies $f_1$ and $f_2$ or $p-q$.

The output signal 23 is detected in detector-limiter 16 to provide waveform 25 having a frequency substantially equal to the frequency at which the effective amplitude 24 of signal 23 waxes and wanes. Signal 25 is limited in the limiting section of detector-limiter 16 to provide waveform 26 of the same frequency as 25. The frequency of 26 is sensed by discriminator 17 to provide a related direct current component 26a which is indicated by ammeter 12. The magnitude of direct current 26a depends upon the frequency of 26.

It is noted that because of the stability of the system no band pass filter is required to filter out unwanted frequencies caused by instabilities. Where filters are required, adequate rejection of the unwanted signals is difficult to attain unless the center of the filter pass band is at a relatively high frequency. Accordingly, the beat frequency of prior art systems requiring band pass filters has been relatively high with a corresponding loss of sensitivity to frequency deviations. Since the present system requires no band pass filtering, the difference frequency may be an audio frequency, thereby enhancing the system sensitivity to changes in the frequency of the variable oscillator.

B+ voltage to the plates of the two oscillators, adder and detector-limiter are supplied from a common regulated power supply 27 through line 29 and terminals 36 and voltage to the filaments of the two oscillators, adder, detector-limiter and discriminator are also supplied from common regulated power supply 27 through line 30 and terminals 37 so that B+ plate voltages in all the units having plates are always substantially the same and filament voltages in all of the units having filaments are always substantially the same. A power supply unit found to be satisfactory is one using a Sola Electric Company saturated flux transformer, type 7104.

Figure 2:
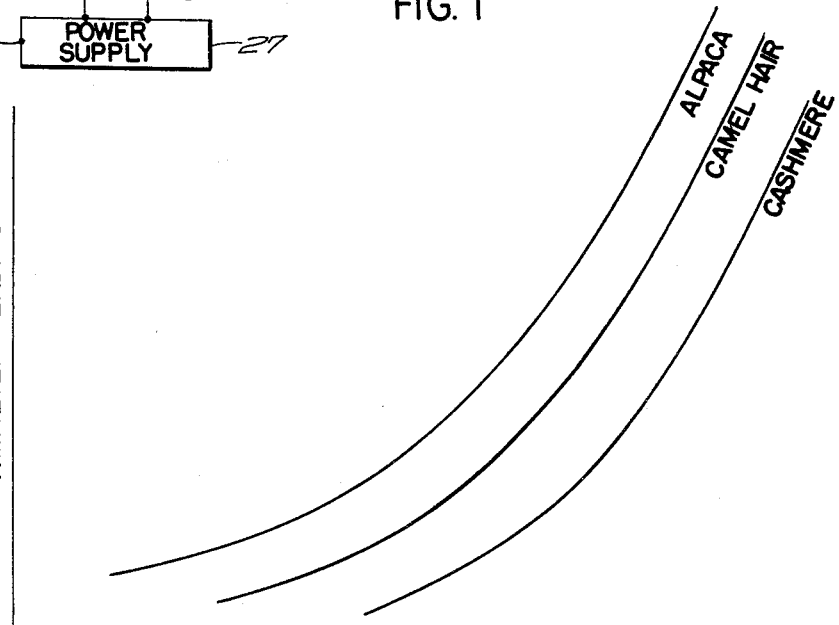
FIG. 2 is a graph illustrating the functional relationship between percentage moisture content and output meter current for some typical textile fibers.

Before considering in detail the circuits of the system, it is appropriate to consider the relation between the current indicated by ammeter 12 and moisture content of various materials. This relation is graphically represented in FIG. 2 where the current is plotted as a function of percentage moisture for three fibers, alpaca, camel hair and cashmere. Note that all three curves are of substantially the same shape, although each is displaced from another by a fixed increment of current. Hence, by biasing current through the ammeter in accordance with the material under test, the meter scale may be calibrated directly in percentage moisture content regardless of the material.

Figure 3:
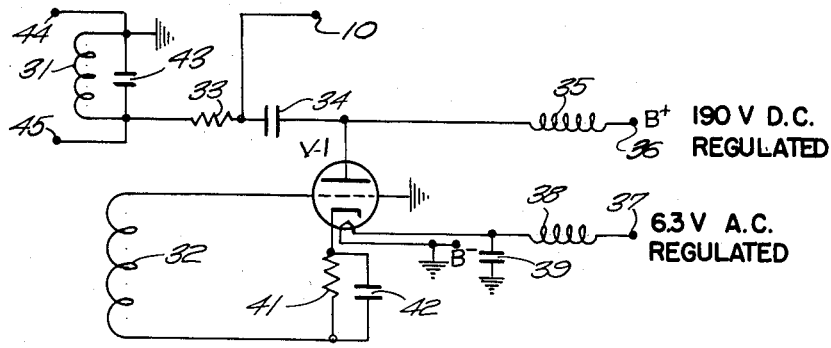
FIG. 3 is a schematic circuit diagram of each of the oscillator circuits of FIG. 1.

Turning now to a consideration of the separate parts of the system, it is appropriate to first mention that in the discussion which follows, the reference numerals in FIG. 1 designate corresponding elements in the remainder of the drawings. With reference to FIG. 3, there is illustrated a schematic circuit diagram of the preferred form of oscillators 13 and 14 of FIG. 1. This circuit is seen to comprise a triode tube V–1 arranged in a grounded grid oscillatory circuit with inductive feedback between the plate and grid circuits being supplied through the mutual coupling between coils 31 and 32. These coils are wound as solenoids on a common axis with the direction of winding arranged to provide positive feedback. One end of coil 31 is grounded and the other coupled to the plate of tube V–1 by resistor 33 and capacitor 34. The resistor 33 decouples the tube from the tank circuit thus enhancing stability of the oscillator. The R-F choke 35 provides a low impedance bulb to D.C. and a high impedance at the oscillator frequency and couples the plate of tube V–1 to regulated source 27 of direct potential applied at terminal 36.

Source 27 of regulated filament potential is coupled from terminal 37 through R.-F. choke 38 to the filament of tube V–1. Capacitor 39 shunts stray R.-F. currents to ground. Resistor 41 and capacitor 42 form a cathode biasing network, and capacitor 43 together with either capacitor 12a (FIG. 1) or capacitive test cell 11 form with inductor 31 the essential frequency-controlling circuit of the oscillator. Terminals 44 and 45 are connected to the plates of capacitive cell 11 in the case of variable oscillator 14 and to the plates of capacitor 12a in the case of reference oscillator 13. The output signal of the oscillator is derived at output terminal 10. The two oscillators 13 and 14 are substantially identical twins as described above so that conditions such as temperature, pressure, humidity, etc., affecting the frequency of one, affect the frequency of the other in the same manner. Consequently, the frequency difference remains substantially the same and the system is stable. The common regulated power source to the plates and filaments of both oscillators cooperate with the twin constructions of the oscillators to provide a remarkably stable system.

Reference capacitor 12a is adjustable.

Figure 4:
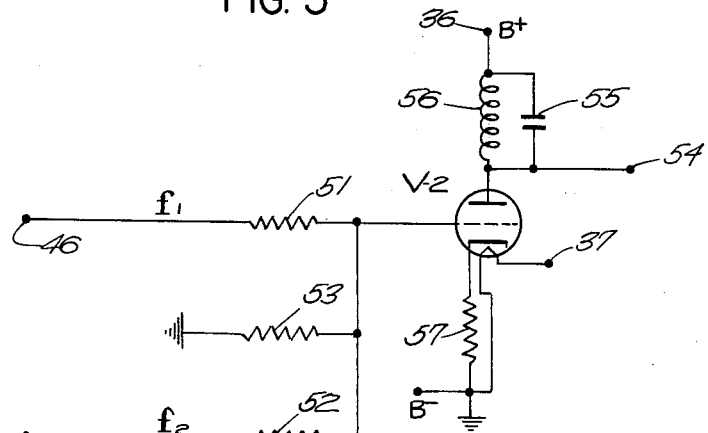
FIG. 4 is a schematic circuit diagram of the adder circuit of FIG. 1.

With reference to FIG. 4, there is illustrated the schematic circuit diagram of adder circuit 15. This circuit is seen to comprise tube V-2 and its associated circuit components. The variable and reference signals are applied on input terminals 46 and 47 from the output terminals 10 of oscillators 14 and 13 respectively and coupled to the grid of tube V-2 by resistors 51 and 52 respectively, together with resistor 53 comprising a resistive adding network. The output signal 23 (FIGS. 1 and 1a) is derived at output terminal 54 across the tuned circuit formed by capacitor 55 and inductor 56 tuned to a frequency in the vicinity of $f_1$ and $f_2$ so that the two frequencies are amplified by substantially the same amount. Unbypassed biasing resistor 57 introduces cathode degeneration to insure substantially linear operation of the amplifier, thereby minimizing the generation of unwanted modulation products.

Figure 5:
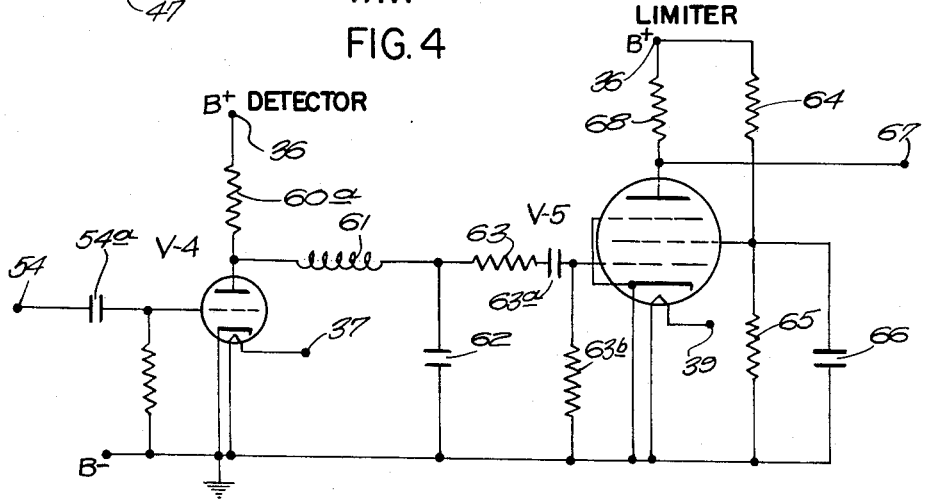
FIG. 5 is a schematic circuit diagram of the detector-limiter circuit of FIG. 1.

With reference to FIG. 5, there is illustrated a schematic circuit diagram of detector-limiter circuit 16. The detector circuit includes tube V-4 coupled to 54 by capacitor 54a and operating as a grid leak detector which detects or rectifies the output signal from adder circuit 16 on terminal 54. The detected or rectified signal across resistor 60a is filtered by the low pass filter formed by inductor 61 and capacitor 62, waveform 25 (FIG. 1a) being developed across capacitor 62. The remainder of the circuit, including tube V-5 forms the limiter. The positive peaks are limited as the grid of tube V-5 draws grid current through resistor 63 while the negative peaks are limited as the grid is driven beyond cutoff. Capacitor 63a and resistor 63b form a coupling network to isolate the D.C. voltage but pass the A.C. voltage to V-5. The screen potential is maintained at a relatively low value by the potential divider formed of resistor 64 and resistor 65 shunted by capacitor 66, thereby assuring a cutoff potential of small magnitude to insure good limiting of the negative peaks. The waveform 26 (FIG. 1a) is derived at terminal 67 across resistor 68.

Figure 6:
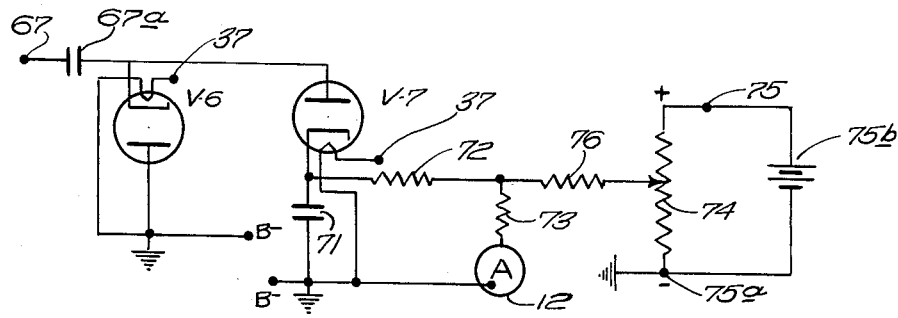
FIG. 6 is a schematic circuit diagram of the discriminator circuit of FIG. 1.

Referring to FIG. 6, a schematic circuit diagram of discriminator 17 is illustrated. The negative edge of waveform 26 on terminal 67 is clamped to ground by clamping diode V-6 (see 26b in FIG. 1a), the cathode of which is coupled to 67 by capacitor 67a. Thus, the full peak-to-peak amplitude of waveform 26 is applied between ground and the plate of diode V-7. Diode V-7 is serially connected to storage capacitor 71 (.01 mfd.) shunted by resistor 72 (100,000 ohms) serially connected to resistor 73 (1,000 ohms) and ammeter 12, the resistance of the latter being negligible. Potentiometer 74 connected across terminals 75 and 75a controls a biasing current supplied from battery 75b through resistors 76 (1,000,000 ohms) and 73 to ammeter 12, for calibrating the meter in accordance with the substance under test. Resistor 76 is made very large to prevent a change in setting of potentiometer 74 from influencing the time constant of the discharge circuit. The resistance of 76 is high to assure that substantially all of the current discharge from capacitor 71 or from the cathode of V-7 passes through the ammeter 12.

Having described the physical connections of this circuit, it is appropriate to describe its mode of operation.

The diode V-7 is serially coupled with capacitor 71, and the pulses 26b, which comprise the clamped waveform 26 passing from the cathode of V-6, are applied to the plate of V-7 to cause the capacitor 71 to become charged through diode V-7 when the pulses are positive. The diode resistance being very low in the forward direction, the capacitor 71 charges very rapidly to a predetermined value. Also, current flows through the resistors 72 and 73 and ammeter 12. The charging of 71 ceases during the intervals between pulses, and during these intervals, the capacitor 71 discharges through resistances 72 and 73 and instrument 12. The time constant of this discharge circuit is made such (0.001 second) that the capacitor 71 discharges relatively slowly during the intervals between charging pulses. As these intervals change with pulse periodicity (moisture content under measurement), the average current discharging through instrument 12 also changes. In FIG. 1a, wave portion 26c represents the voltage to which the capacitor charges rapidly, and portion 26d represents the voltage on the condenser 71 under discharge conditions. The corresponding unidirectional discharge current pulses through instrument 12 are similar and in phase with capacitor voltage 26c and 26d in FIG. 1a, and it will be obvious that the average value of unidirectional current, such as value 26a, will vary with the discharge intervals. As pulse periodicity decreases, the discharge interval increases and the discharge current reaches a smaller minimum value. Since the maximum value of current flowing through instrument 12 in response to the voltage across capacitor 71 is limited by the fixed potential to which the capacitor can be charged, there would be a corresponding decrease in the average value of current indicated. Thus, decrease in frequency is indicated by a decrease in current through instrument 12.

It is to be noted that the discriminator circuit is a non-resonant one which is extremely stable and does not require alignment. Thus, by using low frequency difference it is possible to eliminate the necessity of resonant discriminators which are unstable and require periodic alignment. The apparatus is rapidly and easily changed to directly indicate the percentage moisture content of a different substance by adjusting potentiometer 74. The setting of potentiometer 74 may be noted initially for each substance it is desired to test. Thereafter, it is only necessary to move the potentiometer to the proper setting for the particular substance under test.

Figure 7:
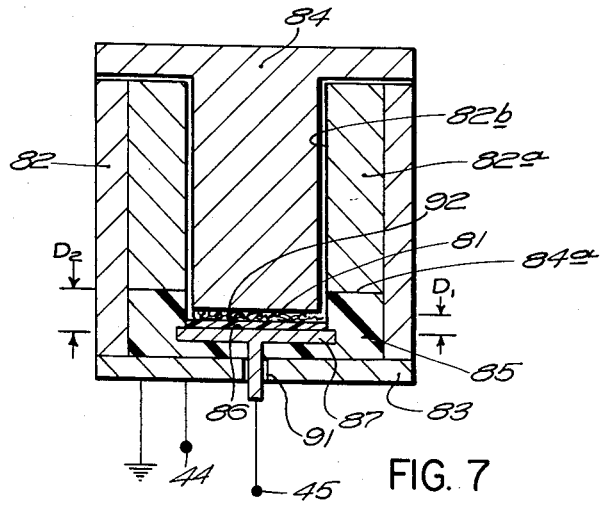
FIG. 7 is a cross-sectional drawing of an embodiment of the capacitive test cell.
Figure 8:
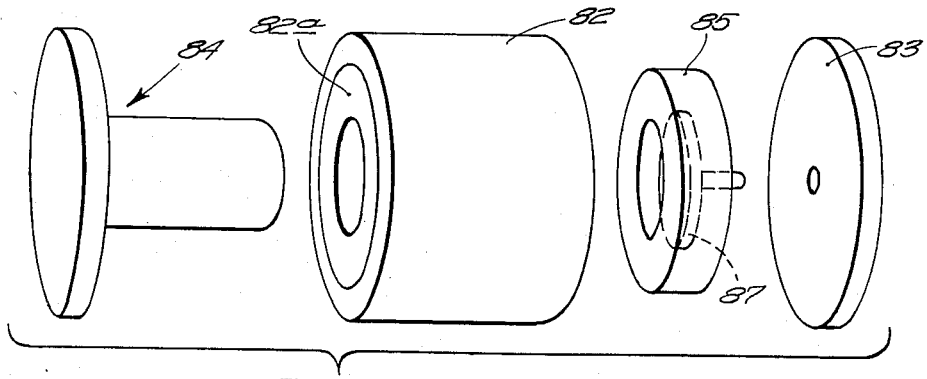
FIG. 8 is an exploded view in perspective of the cell of FIG. 7.

With reference to FIGS. 7 and 8, there is illustrated a cross-sectional drawing of a preferred form of the capacitive test cell 11. The sample 81 under test is completely shielded by the cylindrical member 82, bottom 83, cylindrical bushing 82a and top 84. In the embodiment shown, all of these elements are made of conductive material (metal) so that electricity is conducted therebetween. Member 82, bottom 83 and top 84 comprise a container in which the sample is located. The sample 81 resides within a cylindrical groove or recess within insulator 85 and normally rests upon a piece of insulation 86 which separates the sample 81 from the ungrounded metal plate 87 embedded in insulator 85 and forming a bottom wall of the recess in the insulation. A connection to plate 87 extends through opening 91 and is connected to terminal 45 (FIG. 3). The outer shield is connected to terminal 44 and grounded.

The top 84 is a removable unitary conductive structure of T-shaped cross-section whose bottom portion 92 rests directly above the groove or recess in which sample 81 rests. The bottom 84a of metal bushing 82a rests on the top of insulation 85, the cylindrical wall 82b of the hollow center passage of the bushing being aligned with the cylindrical wall of the groove or recess in insulation 85. The bottom surface 92 of 84 and the bottom surface 84a of bushing 82a together form the grounded plate means of the cell. The peripheral edges of the ungrounded plate 87 and of the grounded plate means made up of 92 and 84a are seen to extend laterally beyond the recess in the insulation so that the projection of the cross section of the recess and the sample 81 therein on ungrounded plate 87 and on the grounded plate means comprising 92 and 84a is less than the cross-sectional area of the ungrounded plate and the grounded plate means respectively. It is preferable to extend plate 87 so its diameter is greater than the diameter of the constrained sample by twice the thickness of the sample. Hence, the lines of electric flux which extend from bottom portion 92 through the sample to ungrounded plate 87 are substantially free from fringing effects and errors due to uneven concentration of the sample are minimized. The distance $D_2$ between the bottom 84a of bushing 82a and the top of plate 87 is such that the dielectric constant of the insulation 85 therebetween provides the same capacitance effect as though the bottom of the bushing were spaced a distance $D_1$ from the top of plate 87, thereby compensating for the difference in dielectric constant of the wool sample and the insulation. This is necessary in order to have the plates, made up of plate 87 and plate means 84a and 92, electrically parallel since the effective dielectric constant of wool is about 1.2 due to light packing.

Insulation strip 86 can be omitted in many instances.

Figure 9:
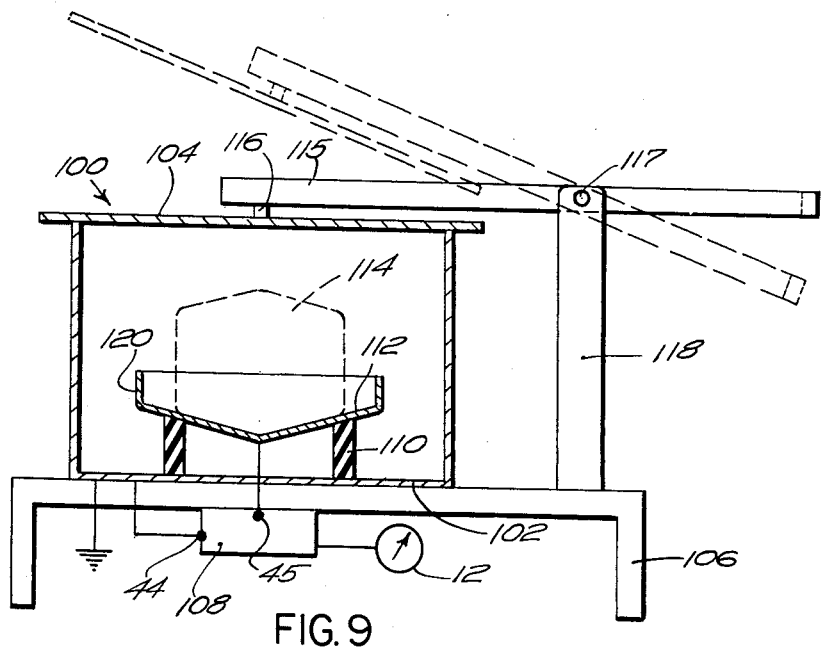
FIG. 9 is a cross-sectional drawing of another embodiment of the capacitive test cell showing in full lines the cover in operating position and in dotted lines the cover swung to a partially open position, also showing a ball of wool top contained therein.
Figure 10:
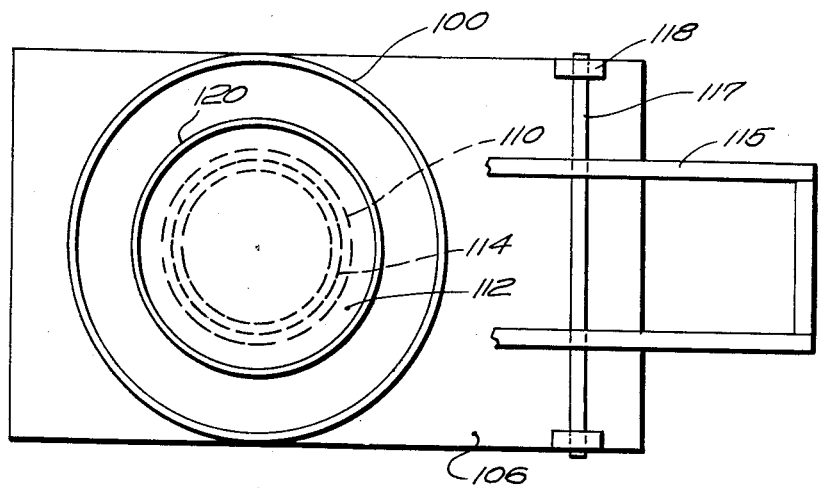
FIG. 10 is a top view of the cell of FIG. 9 with the cover cut away.

FIGS. 9 and 10 show an alternate cell construction in which the moisture content of whole balls of wool top can be measured without removing them from the bags in which they come from the mill and without removing small samples therefrom.

It is made up of a hollow cylindrical metal container 100 comprising a bottom 102 and a removable metal top lid 104. The container is supported on a stand 106 made, for example, from angle iron and underneath which is mounted the electronic moisture detecting unit 108 made up of the electronic parts described above including ammeter 12. Mounted on the bottom 102 of container 100 by means of a cylindrical shaped support 110, made of an insulation material, is the ungrounded capacitor plate 112 having the shape of a hollow inverted cone, as shown, and on which is supported a ball of wool top 114 which is about 15 inches in diameter and 14 inches high. Plate 112 is electrically connected to terminal 45 of the variable oscillator 14 of the unit 108 and the metal container 100 is connected with terminal 44 and ground as shown. Lid 104 is attached to the end of a pair of arms 115 by means of connection 116. Arms 115 are pivotally mounted at 117 on member 118 which is mounted on stand 106 so that the arms 115 and lid 104 can be swung between the position shown in full lines in FIG. 9 in which the lid is closed and the position shown in dotted lines in which the lid is partially open. It is apparent that the lid can be swung completely open so that a ball of wool top can be placed in and removed from the cell.

It is noted that ungrounded capacitor plate 112 and lid 104, which forms the grounded plate of the capacitor, both extend laterally beyond the periphery of the wool top 114. This prevents high fringing flux lines from entering the ball of top, thus reducing effects due to positioning the center of the ball of top with respect to the center of the cell. This arrangement avoids fringing effects and errors due to non-uniform concentration of moisture within the sample. Hollow metal cylinder 120 mounted around the peripheral edge of plate 112 and extending upwardly to about the vertical mid-portion of ball 114 also aids in avoiding these fringing effects and errors. The conical shape of 112 aids in easily and properly positioning the ball of top by the operator.

The bottom of the lid is about 2½ inches from the upper surface of the ball of top. It is preferable to have this distance between zero to five inches to minimize serious capacitance effects and yet achieve a fairly uniform flux distribution throughout the ball of top. Larger distances between the lid and the ball of top reduce the amount of flux going through the center of the ball.

Figure 11:
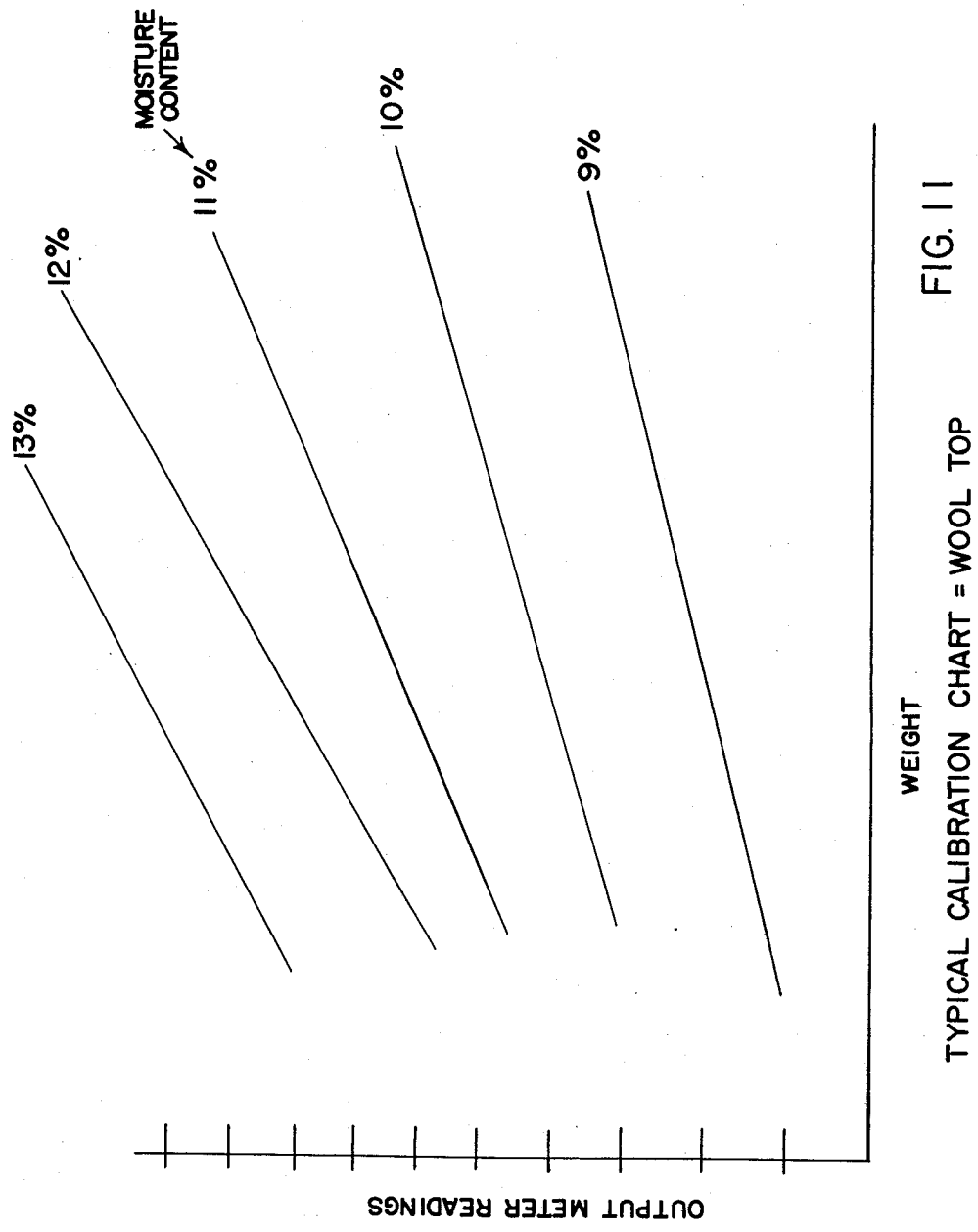
FIG. 11 is a graph showing the relationship of ammeter readings for measuring the moisture content of wool top, the weight of the wool top and percent moisture of the wool top.

To use this cell, the operator need only lift the hinged lid and insert a ball as shown. He then closes the lid and reads meter 12. He then removes the ball and weighs it and by referring to the chart shown in FIG. 11 he can determine directly the percent moisture of the ball of top.

The cell shown in FIGS. 9 and 10 is useful not only in measuring the moisture content of balls of wool top but also can be efficiently used to measure the moisture content of any sample which is relatively large in size.

The use of an adjustable current displacement potentiometer permits direct reading of the instrument for a number of substances. Moreover, the indicated measurement is extremely precise and accurate. Since the relative stability of the oscillators can be maintained within 20 c.p.s. and a frequency change of 300 c.p.s. corresponds to a change in moisture content of approximately one percent, readings accurate to better than 0.1% are easily and rapidly obtained.

During use of the apparatus it is desirable to check the operation of the instrument with a known sample or slug which will give a known reading. This slug simulates the substance under test and comprises a piece of a stable, non-hygroscopic material. If two such pieces are used, one different in size or composition from the other, and giving a different known reading from the other, then it is possible to determine or check two operating points within or at extremes of the useful range of the apparatus. This arrangement will prevent erroneous tests being made while the apparatus may be unknowingly deficient due to a component, such as a vacuum tube, becoming faulty, but not inoperative, during use. In practice, the first slug is inserted in the test cell and tested and if the reading is not what it should be, the reference capacitor is adjusted to provide the correct reading and then the second slug is inserted. If the correct reading for the second slug is obtained, the instrument is working correctly. If not, there is something wrong.

Round discs of polystyrene have been used successfully as slugs, but other plastics or other materials such as metals may be used.

It is understood that the values given for the various capacitors, resistors and other elements in the drawings are merely representative and the invention is not limited thereto.

The apparatus and method of the invention has been successfully used to measure the moisture content of bulk wool, scoured cashmere, bleached cashmere and other bulk fibers and can be used to measure the moisture content of all fibers including cones of yarn. During usual processing, the moisture content of natural fibers usually varies from 6 to 18% whereas synthetics usually vary from ½% to 7%.

It is apparent that one skilled in the art may now make numerous modifications of and departures from the specific embodiment described herein without departing from the inventive concepts. Consequently, the invention is to be construed as limited only by the spirit and scope of the appended claims.

I claim:

1. Apparatus for determining a property of a substance by measuring its capacitivity, comprising a pair of substantially twin oscillators both exposed to the same environmental conditions and each having a separate tuned resonant circuit for generating two high frequency signals which vary by substantially the same amounts and in the same sense with changes in said environmental conditions, the tuned circuit of one of said oscillators including a capacitor test cell for receiving said substance therein and exhibiting capacity related to the capacitivity of said substance, said test cell comprising a pair of capacitor electrodes, insulating means supporting said electrodes in spaced-apart relationship and with a measurement space therebetween for receiving said substance, and grounded electrically-conductive means shielding said space and confining the electric fields from said electrodes within said cell, said one of said oscillators producing signals varying in frequency with the capacitivity of said substance within an audio frequency range of the frequency of the other of said signals, means for combining said signals, means for demodulating from the signals combined by said combining means difference signals within said audio frequency range, means limiting said difference signals to produce unidirectional pulses of predetermined amplitude, a capacitor, means for charging said capacitor with said pulses, a D.-C. current-averaging indicating instrument, and means for discharging said capacitor through said instrument during intervals between said pulses.

2. Apparatus for determining a property of a substance by measuring its capacitivity, comprising reference and variable oscillators both of which are exposed to the same environmental conditions and each of which has a separate tuned resonant circuit controlling the generation of output signals of reference and variable frequencies respectively which vary by substantially the same amounts and in the same sense with changes in said environmental conditions, said tuned circuit of said variable oscillator including a capacitor test cell for receiving said substance therein and exhibiting capacity related to the capacitivity of said substance, said test cell comprising a pair of capacitor electrodes, insulating means supporting said electrodes in spaced-apart relationship and with a measurement space therebetween for receiving said substance, and grounded electrically-conductive means shielding said space and confining the electric fields from said electrodes within said cell, said variable frequency varying within an audio frequency range of said reference frequency in accordance with the capacity of said test cell and consequently in accordance with the magnitude of the capacitivity of said substance, means adding said output signals from said oscillators to provide a summed output signal the effective amplitude of which waxes and wanes at a frequency substantially equal to difference in the frequencies of said output signals and variable with said capacitivity within said audio frequency range, means demodulating said summed output signal and producing a related output of pulses therefrom, non-resonant pulse-counting means responsive to said pulses and producing unidirectional output signals related to the perodicity of said pulses, and a direct-indicating D.-C. instrument connected with said pulse-counting means to indicate said property.

3. Apparatus for directly indicating the moisture content of a substance, comprising reference and variable oscillators both of which are exposed to the same environmental conditions and each of which has a separate tuned resonant circuit controlling the generation of output signals of fixed and variable frequencies respectively which vary by substantially the same amounts and in the same sense with changes in said environmental conditions, a capacitive test cell for receiving said substance therein and exhibiting capacity related to the capacitivity of said substance, said test cell comprising a pair of capacitor electrodes, insulating means supporting said electrodes in spaced-apart relationship and with a measurement space therebetween for receiving said substance, and grounded electrically-conductive means shielding said space and confining the electric fields from said electrodes within said cell, means for coupling the test cell capacity to the frequency controlling circuit of said variable oscillator whereby said variable frequency output signals generated thereby are related to said capacitivity and are within an audio frequency range of frequency of output signals generated by the reference frequency oscillator, means for combining said oscillator output signals to provide an output signal whose effective amplitude waxes and wanes at an audio frequency equal to the difference between said reference and variable frequencies, means for detecting said combined output signal to derive a detected signal of frequency substantially equal to the frequency at which the effective amplitude of said combined output signal waxes and wanes, means for limiting the detected signal to produce pulses of predetermined amplitude, means for clamping said pulses, a non-resonant pulse-counting circuit for producing direct current output signals related to the periodicity of said clamped pulses, and a direct current meter energized by said pulse-counting circuit indicating the moisture content of said substance according to the magnitude of said direct current signals.

4. A capacitive test cell adapted to be connected to the frequency controlling circuit of an oscillator comprising a grounded, hollow container made of a conductive material, first plate means within said container, second plate means grounded to said container, means insulating said first plate means from said container and positioning surfaces of said first plate means opposite to surfaces of said second plate means to form a hollow measurement space therebetween centrally of said surfaces of said first plate means and to receive and hold a sample of a substance substantially centrally of said first plate means, each of said surfaces extending peripherally beyond said central measurement space by at least a predetermined amount whereby the electric field through said central space is symmetrically distributed.

5. A test cell according to claim 4 wherein said container has a grounded cover also made of a conductive material and removable to provide access to said central measurement space, at least a part of said second plate means comprising said cover.

6. A test cell according to claim 4 wherein said surfaces of said first plate means are in the shape of an inverted hollow cone, and wherein said insulating means comprises support means made of insulation material supporting said first plate means in said container with the apex of said cone lowermost, said first plate means and said container and said space being of size accommodating within said container and space and supported centrally upon said inverted hollow cone surfaces of said first plate means a ball of wool top.

7. A test cell according to claim 6 wherein said container has a grounded cover removable to provide access to said measurement space and inverted hollow cone, at least a part of said second plate means surfaces comprising inner surfaces of said removable cover, said container and said first plate means and said insulating means being dimensioned to accommodate said ball within said central measurement space in spaced relationship to said cover and the sides of the container, and said inverted cone having a cylindrical lip extending upwardly toward said cover from about the periphery thereof.

8. A test cell adapted to be connected in the frequency controlling circuit of an oscillator, said cell comprising a grounded, hollow container made of a conductive material, a bushing in said container made of a conductive material, an end surface of said bushing comprising at least part of second plate means, a cover for said container made of a conductive material, a center member receivable in said bushing, an end of said center member comprising at least a part of said second plate means, said ends of said bushing and center member being spaced from the bottom of said container, insulation material located between said end of said bushing and said bottom of said container and between said end of said center piece and said bottom of said container, said insulation having a recess in a surface thereof for receiving a substance to be tested, said recess facing and being axially aligned with the bore of said bushing, first plate means forming the bottom of said recess and spaced from said end of said center piece, a peripheral portion of said first plate means extending beyond the cross sectional area of said recess and being embedded in said insulation, said first plate means being insulated from said container.

9. A test cell according to claim 8 wherein said insulation material is located between said peripheral portion of said first plate means and said end of said bushing, said end of said bushing being spaced further from said first plate means than said end of said center piece by an amount which compensates for the difference in dielectric constant between said substance and said insulation to provide substantially the same capacitive effect between said end of said bushing and said peripheral portion as between said first plate means and said end of said center piece.

10. Apparatus for determining the moisture content of a substance by measuring its capacitivity, comprising a pair of substantially twin resonant circuit oscillators exposed to the same environmental conditions for generating two high frequency signals which vary substantially the same amount and in the same sense with changes in said environmental conditions, a capacitor test cell connected in the resonant circuit of one of said oscillators and adapted to receive said substance therein and to exhibit capacity related to and variable with the capacitivity of said substance, said test cell comprising a pair of capacitor electrodes, insulating means supporting said electrodes in spaced-apart relationship and with a measurement space therebetween for receiving said substance, and grounded electrically-conductive means shielding said space and confining the electric fields from said electrodes within said cell, said test cell producing variations in frequency of signals from said one of said oscillators which are within an audio frequency range of the frequency of signals produced by the other of said oscillators, means combining said signals and producing difference signals therebetween of audio frequency values, means limiting said difference signals to produce pulses of predetermined amplitude, a capacitor, means for charging said capacitor with said pulses, means for discharging said capacitor during intervals between said pulses, and output indicating means responsive to discharges of said capacitor during said intervals between said pulses.

References Cited in the file of this patent

UNITED STATES PATENTS

| | | |
|---|---|---|
| 1,686,365 | Becker | Oct. 2, 1928 |
| 1,855,569 | Chireix | Apr. 26, 1932 |
| 1,999,319 | Dowling | Apr. 30, 1935 |
| 2,021,760 | Whitney | Nov. 19, 1935 |
| 2,043,241 | Eyer | June 9, 1936 |
| 2,222,221 | Burford | Nov. 19, 1940 |
| 2,266,114 | Bartlett | Dec. 16, 1941 |
| 2,307,316 | Wolff | Jan. 5, 1943 |
| 2,324,077 | Goodale et al. | July 13, 1943 |
| 2,403,557 | Sanders | July 9, 1946 |
| 2,403,615 | Sanders | July 9, 1946 |
| 2,472,784 | Barnes et al. | June 14, 1949 |
| 2,511,233 | Anderson | June 13, 1950 |
| 2,516,768 | Grob et al. | July 25, 1950 |
| 2,571,439 | Glass | Oct. 16, 1951 |
| 2,593,766 | Kimball et al. | Apr. 22, 1952 |
| 2,604,513 | Parkinson et al. | July 22, 1952 |
| 2,613,249 | Babb | Oct. 7, 1952 |
| 2,617,855 | Etheridge | Nov. 11, 1952 |
| 2,722,657 | Janssen | Nov. 1, 1955 |
| 2,737,469 | Anderson et al. | Mar. 6, 1956 |
| 2,750,500 | Aiken | June 12, 1956 |
| 2,752,566 | Quinton | June 26, 1956 |
| 2,768,629 | Maul | Oct. 30, 1956 |
| 2,774,940 | Bernet | Dec. 18, 1956 |

FOREIGN PATENTS

| | | |
|---|---|---|
| 396,098 | Great Britain | July 31, 1933 |
| 899,618 | Germany | Dec. 14, 1953 |
| 1,063,150 | France | Apr. 29, 1959 |

OTHER REFERENCES

Bradshaw: "A Change of Capacitance Method for the Measurement of Mechanical Displacements," Journal of Scientific Instruments, June 1945; vol. 22, pages 112–114.